(12) United States Patent
Lin et al.

(10) Patent No.: US 10,496,747 B2
(45) Date of Patent: Dec. 3, 2019

(54) TEXT INFORMATION PROCESSING METHOD AND APPARATUS

(71) Applicant: TENCENT TECHNOLOGY (SHENZHEN) COMPANY LIMITED, Shenzhen (CN)

(72) Inventors: Quanchen Lin, Shenzhen (CN); Lichun Liu, Shenzhen (CN); Jianchun Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 42 days.

(21) Appl. No.: 15/940,159

(22) Filed: Mar. 29, 2018

(65) Prior Publication Data

US 2018/0217979 A1    Aug. 2, 2018

Related U.S. Application Data

(63) Continuation of application No. PCT/CN2017/073020, filed on Feb. 7, 2017.

(30) Foreign Application Priority Data

Feb. 18, 2016    (CN) .......................... 2016 1 0091229

(51) Int. Cl.
G06F 17/27    (2006.01)
(52) U.S. Cl.
CPC ........ *G06F 17/2775* (2013.01); *G06F 17/277* (2013.01); *G06F 17/2735* (2013.01)
(58) Field of Classification Search
CPC . G06F 17/2775; G06F 17/2735; G06F 17/277
See application file for complete search history.

(56) References Cited

U.S. PATENT DOCUMENTS

| | | | |
|---|---|---|---|
| 9,594,741 B1* | 3/2017 | Thakurta | G06N 3/126 |
| 2007/0078644 A1* | 4/2007 | Huang | G06F 17/277 |
| | | | 704/9 |

(Continued)

FOREIGN PATENT DOCUMENTS

| | | |
|---|---|---|
| CN | 101079027 A | 11/2007 |
| CN | 101706807 A | 5/2010 |

(Continued)

OTHER PUBLICATIONS

Japanese Office Action dated May 7, 2019 in Application No. 2018-518610 with English translation, 5 pages.

(Continued)

*Primary Examiner* — Mohammad K Islam
(74) *Attorney, Agent, or Firm* — Oblon, McClelland, Maier & Neustadt, L.L.P.

(57) ABSTRACT

The disclosure provides a text information processing method. Training textual data is determined according to text information, and characters and strings are identified from the training textual data. For each of the identified characters, a respective independent probability of appearance among the training textual data is calculated. For each of the identified strings, a respective joint probability of appearance among the training textual data is calculated. Whether a particular string of the identified strings corresponds to a candidate neologism is determined according to independent probabilities of various characters of the particular string and the joint probability of the particular string. Moreover, the candidate neologism is determined as a neologism when the candidate neologism is not in a preset dictionary and a joint probability of the candidate neologism is greater than a preset threshold.

20 Claims, 5 Drawing Sheets

(56) References Cited

U.S. PATENT DOCUMENTS

| | | | |
|---|---|---|---|
| 2008/0162118 A1* | 7/2008 | Itoh | G06F 17/2735 |
| | | | 704/10 |
| 2009/0313017 A1* | 12/2009 | Nakazawa | G06F 17/2715 |
| | | | 704/244 |
| 2014/0058722 A1* | 2/2014 | Sun | G06F 17/2735 |
| | | | 704/9 |
| 2016/0283583 A1* | 9/2016 | Liu | G06F 17/277 |
| 2017/0371865 A1* | 12/2017 | Eck | G06F 17/2809 |
| 2018/0365223 A1* | 12/2018 | Hsu | G06F 17/2785 |

FOREIGN PATENT DOCUMENTS

| | | |
|---|---|---|
| CN | 102681981 A | 9/2012 |
| CN | 102708147 A | 10/2012 |
| CN | 102955771 A | 3/2013 |
| CN | 104102658 A | 10/2014 |
| JP | 8-161340 | 6/1996 |
| JP | 11-134334 | 5/1999 |
| WO | WO-2015135452 A1 * | 9/2015 ........... G06F 17/277 |

OTHER PUBLICATIONS

Chinese Office Action dated May 7, 2019 in Application No. 201610091229X with a concise explanation of relevance, 10 pages.
CSON https//blog.csdn.net/gzdmcaoyc/article/details/50001801, Jan. 23, 2015, 15 pages (relying on AX as a concise explanation of relevance, where AY is categorized as "Category X" and used for rejection).
International Search Report dated May 2, 2017 issued in PCT/CN2017/073020 (with English translation), 6 pages.
PCT Written Opinion of the International Searching Authority dated May 2, 2017 in PCT/CN2017/073020 with English translation, 7 pages.
PCT International Preliminary Report on Patentability dated Aug. 21. 2018 in PCT/CN2017/073020 with English translation, 4 pages.

* cited by examiner data# TEXT INFORMATION PROCESSING METHOD AND APPARATUS

RELATED APPLICATION

This application is a continuation of International Application No. PCT/CN2017/073020, filed on Feb. 7, 2017, which claims priority to Chinese Patent Application No. 201610091229.X, filed on Feb. 18, 2016 and entitled "TEXT INFORMATION PROCESSING METHOD AND APPARATUS." The entire disclosures of the prior applications are hereby incorporated by reference herein in their entirety.

FIELD OF THE TECHNOLOGY

This application relates to the field of communications technologies.

BACKGROUND OF THE DISCLOSURE

With the continuous development of science and technology, the volume of textual data generated by users has increased exponentially, and many neologisms such as "SARS" emerge in association with new articles, events, or experiences. The occurrence of the neologisms usually overwhelms some text information processing models, such as the models for a word segmentation process. A word segmentation process in Chinese natural language processing usually functions as a fundamental step. The quality or precision of a word segmentation result of a piece of text information affects subsequent text information processing tasks such as text classification, text clustering, and/or topic identification. In many applications, a neologism discovery process may be implemented to address the above-identified issues.

Usually, neologism discovery methods may be classified into statistics-based methods and rule-based methods. A statistics-based method is usually implemented based on generating statistic information using a hidden Markov model, maximum entropy, a support vector machine, and/or the like. The statistics information can be used for generating a word segmentation model. Moreover, a rule-based method is implemented based on deriving a set of rules from a template feature library and training textual data that includes labeled contextual features. The set of derived rules may correspond to word formation rules and can be applied to a piece of to-be-processed text information that may include a neologism.

The inventor of this application notes that all of the foregoing solutions include performing a word segmentation process on the textual data. The inventor notes that a neologism discovery method that is based on word segmentation usually includes performing, repetitively in interactions, combination of training textual data and a piece of to-be-processed text information, generation of updated training textual data for generating an updated word segmentation model, and discovery of a neologism. However, such iterative processes are complex and demanding on computational resources. In addition, at a neologism discovery stage, because a to-be-discovered neologism does not have a definite definition, a neologism discovery method may not be able to significantly improve its performance based on determining a boundary of the to-be-discovered neologism and/or relying on a known dictionary or rule.

SUMMARY

Embodiments of this application provide a text information processing method, apparatus, and non-transitory computer-readable storage medium, which not only can simplify a procedure and save computational resources but also can improve a successful rate and efficiency in discovering neologisms.

Aspects of the disclosure provide a text information processing method. Training textual data is determined according to text information, and characters and strings are identified from the training textual data by processing circuitry of a text information processing apparatus. For each of the identified characters, a respective independent probability of appearance among the training textual data is calculated. Also, for each of the identified strings, a respective joint probability of appearance among the training textual data is calculated. Whether a particular string of the identified strings corresponds to a candidate neologism is determined by the processing circuitry of the text information processing apparatus according to independent probabilities of various characters of the particular string and the joint probability of the particular string. Moreover, after the particular string is determined to correspond to the candidate neologism, the candidate neologism is determined by the processing circuitry of the text information processing apparatus as a neologism when the candidate neologism is not in a preset dictionary and a joint probability of the candidate neologism is greater than a preset threshold. In an embodiment, each string includes at least two consecutive characters.

In an embodiment, respective count numbers of the identified characters in the training textual data, respective count numbers of the identified strings in the training textual data, and a total number of characters in the training textual data are collected. For each of the identified characters, the respective independent probability of appearance among the training textual data is calculated by calculating the independent probability of a particular character according to the count number of the particular character in the training textual data and the total number of characters in the training textual data. For each of the identified strings, the respective joint probability of appearance among the training textual data is calculated by calculating the joint probability of a particular string according to the count number of the particular string in the training textual data and the total number of characters in the training textual data.

In an embodiment, the particular string is determined as corresponding to the candidate neologism when the joint probability of the particular string is greater than a product of the independent probabilities of various characters of the particular string.

In an embodiment, after the particular string is determined to correspond to the candidate neologism, the joint probability of the candidate neologism is determined according to the joint probability of the particular string and a pattern of the candidate neologism in the training textual data.

In an embodiment, for determining the joint probability of the candidate neologism, a time required for reading from a training start position in the training textual data to a position of the candidate neologism is estimated, to obtain a forward time, a time required for reading from the position of the candidate neologism to a training end position in the training textual data is estimated, to obtain a backward time, and the joint probability of the candidate neologism is updated by using a preset exponential decay function according to the forward time and the backward time. The exponential decay function may be constructed according to an Ebbinghaus forgetting curve.

In an embodiment, for estimating the time required for reading from the training start position in the training textual data to the position of the candidate neologism, a distance between the training start position in the training textual data to the position of the candidate neologism is calculated, to obtain a first distance, and the first distance is divided by a preset reading speed, to obtain the forward time.

In an embodiment, for estimating the time required for reading from the position of the candidate neologism to the training end position in the training textual data, a distance between the position of the candidate neologism to the training end position in the training textual data is calculated, to obtain a second distance, and the second distance is divided by a preset reading speed, to obtain the backward time.

Aspects of the disclosure further provide a text information processing apparatus that includes processing circuitry. The processing circuitry determines training textual data according to text information, identifies characters and strings from the training textual data, calculates for each of the identified characters a respective independent probability of appearance among the training textual data, and calculates for each of the identified strings a respective joint probability of appearance among the training textual data. Moreover, processing circuitry determines whether a particular string of the identified strings corresponds to a candidate neologism according to independent probabilities of various characters of the particular string and the joint probability of the particular string, and, after the particular string is determined to correspond to the candidate neologism, determines the candidate neologism as a neologism when the candidate neologism is not in a preset dictionary and a joint probability of the candidate neologism is greater than a preset threshold. In an embodiment, each string includes at least two consecutive characters.

In an embodiment, the processing circuitry further collects respective count numbers of the identified characters in the training textual data, respective count numbers of the identified strings in the training textual data, and a total number of characters in the training textual data. The processing circuitry further calculates the independent probability of a particular character according to the count number of the particular character in the training textual data and the total number of characters in the training textual data, and calculates the joint probability of a particular string according to the count number of the particular string in the training textual data and the total number of characters in the training textual data.

In an embodiment, the processing circuitry further determines that the particular string correspond to the candidate neologism when the joint probability of the particular string is greater than a product of the independent probabilities of various characters of the particular string.

In an embodiment, the processing circuitry further determines, after the particular string is determined to correspond to the candidate neologism, the joint probability of the candidate neologism according to the joint probability of the particular string and a pattern of the candidate neologism in the training textual data.

In an embodiment, the processing circuitry further estimates a time required for reading from a training start position in the training textual data to a position of the candidate neologism, to obtain a forward time, estimates a time required for reading from the position of the candidate neologism to a training end position in the training textual data, to obtain a backward time, and updates the joint probability of the candidate neologism by using a preset exponential decay function according to the forward time and the backward time. The exponential decay function may be constructed according to an Ebbinghaus forgetting curve.

In an embodiment, the processing circuitry further calculates a distance between the training start position in the training textual data to the position of the candidate neologism, to obtain a first distance, and divides the first distance by a preset reading speed, to obtain the forward time.

In an embodiment, the processing circuitry further calculates a distance between the position of the candidate neologism to the training end position in the training textual data, to obtain a second distance, and divides the second distance by a preset reading speed, to obtain the backward time.

Aspects of the disclosure further provide a non-transitory computer readable storage medium storing program instructions, which, when being executed by a processor of a computer, cause the computer to perform at least the operations described herein. For example, training textual data is determined according to text information, and characters and strings are identified from the training textual data. For each of the identified characters, a respective independent probability of appearance among the training textual data is calculated. For each of the identified strings, a respective joint probability of appearance among the training textual data is calculated. Whether a particular string of the identified strings corresponds to a candidate neologism is determined according to independent probabilities of various characters of the particular string and the joint probability of the particular string, and after the particular string is determined to correspond to the candidate neologism, the candidate neologism is determined as a neologism when the candidate neologism is not in a preset dictionary and a joint probability of the candidate neologism is greater than a preset threshold.

In an embodiment, the stored program instructions, when being executed by the processor of the computer, further cause the computer to perform at least the operations described herein. For example, after the particular string is determined to correspond to the candidate neologism, the joint probability of the candidate neologism is determined according to the joint probability of the particular string and a pattern of the candidate neologism in the training textual data.

BRIEF DESCRIPTION OF THE DRAWINGS

To describe various embodiments of this application, the following briefly introduces the accompanying drawings The accompanying drawings in the following description show only some embodiments of this application, and a person of ordinary skill in the art may still derive other drawings from these accompanying drawings.

DESCRIPTION OF EMBODIMENTS

The following describes various embodiments of this application with reference to the accompanying drawings of this application. The described embodiments are merely exemplary embodiments of this application rather than all of the embodiments. All other embodiments obtained by a person skilled in the art based on the embodiments of this application shall fall within the protection scope of this application.

Figure 1A:
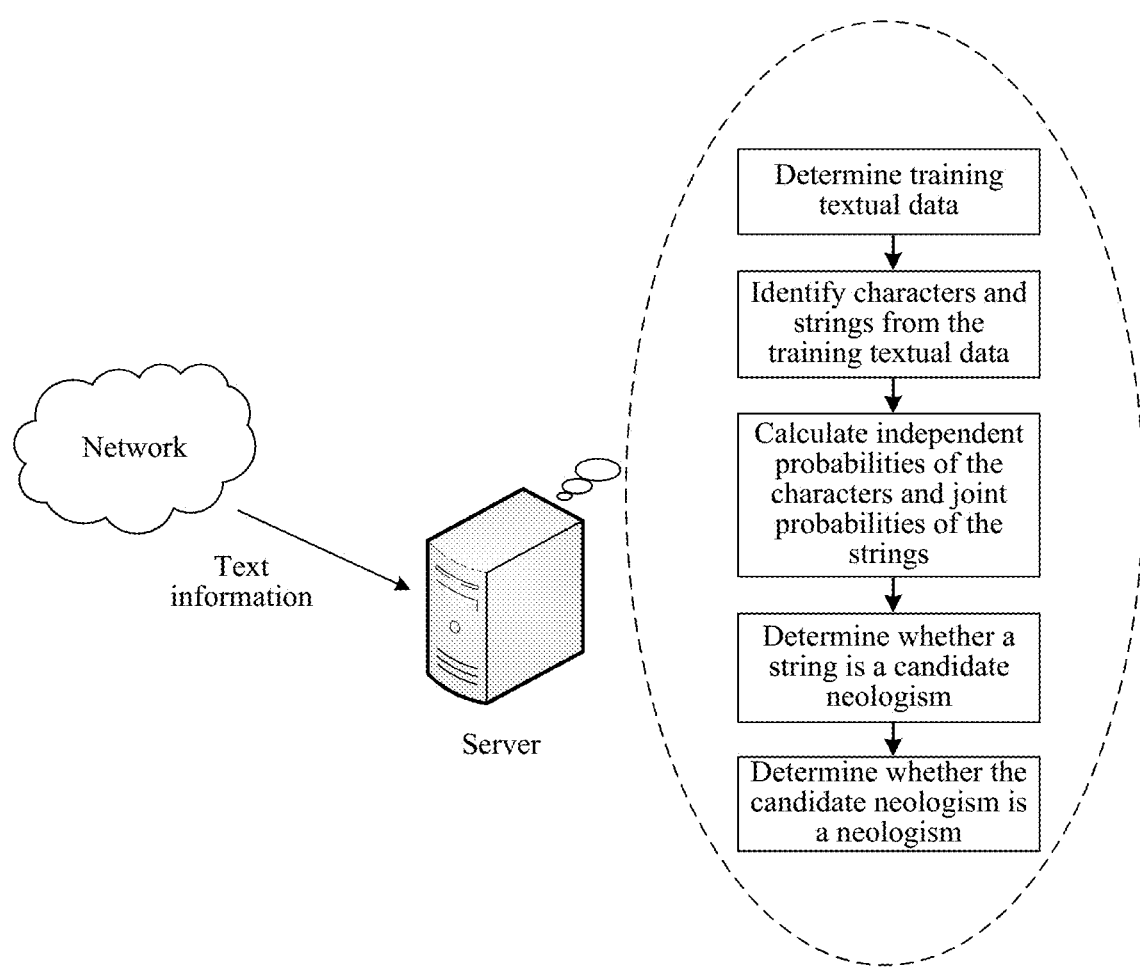
FIG. 1a is a diagram illustrating a scenario where a server is configured to perform a text information processing method according to an embodiment of this application.

The embodiments of this application provide a text information processing method, apparatus, and non-transitory computer readable storage medium. The text information processing method may be performed by various computing apparatuses such as a server computer (or simply "server" in this disclosure). The text information processing apparatus may be integrated into various computing apparatuses such as a server. The non-transitory computer-readable storage medium may store program instructions which when executed by a processor of a computer cause the computer to perform the text information processing method. As shown in FIG. 1a, the server may obtain text information, including for example, news, information about movies and television dramas, or user generated content (UGC) such as articles, micro blogs and/or blogs published by users from a network; determine training textual data according to the text information; identify from the training textual data characters and strings; calculate for each of the identified characters a respective independent probability of appearance among the training textual data; calculate for each of the identified strings a respective joint probability of appearance among the training textual data; determine whether a particular string of the identified strings corresponds to a candidate neologism according to independent probabilities of various characters of the particular string and the joint probability of the particular string; and, after the particular string is determined to correspond to the candidate neologism, determine the candidate neologism as a neologism when the candidate neologism is not in a preset dictionary and a joint probability of the candidate neologism is greater than a preset threshold.

Detailed descriptions of exemplary embodiments are provided below.

Embodiment 1

This embodiment is described in terms of a text information processing method. The text information processing method may be performed by an apparatus such as a server.

The text information processing method includes: determining training textual data according to text information; identifying, by processing circuitry of a text information processing apparatus, characters and strings from the training textual data; calculating for each of the identified characters a respective independent probability of appearance among the training textual data; calculating for each of the identified strings a respective joint probability of appearance among the training textual data; determining, by the processing circuitry of the text information processing apparatus, whether a particular string of the identified strings corresponds to a candidate neologism according to independent probabilities of various characters of the particular string and the joint probability of the particular string; and, after the particular string is determined to correspond to the candidate neologism, determining, by the processing circuitry of the text information processing apparatus, the candidate neologism as a neologism when the candidate neologism is not in a preset dictionary and a joint probability of the candidate neologism is greater than a preset threshold.

Figure 1B:
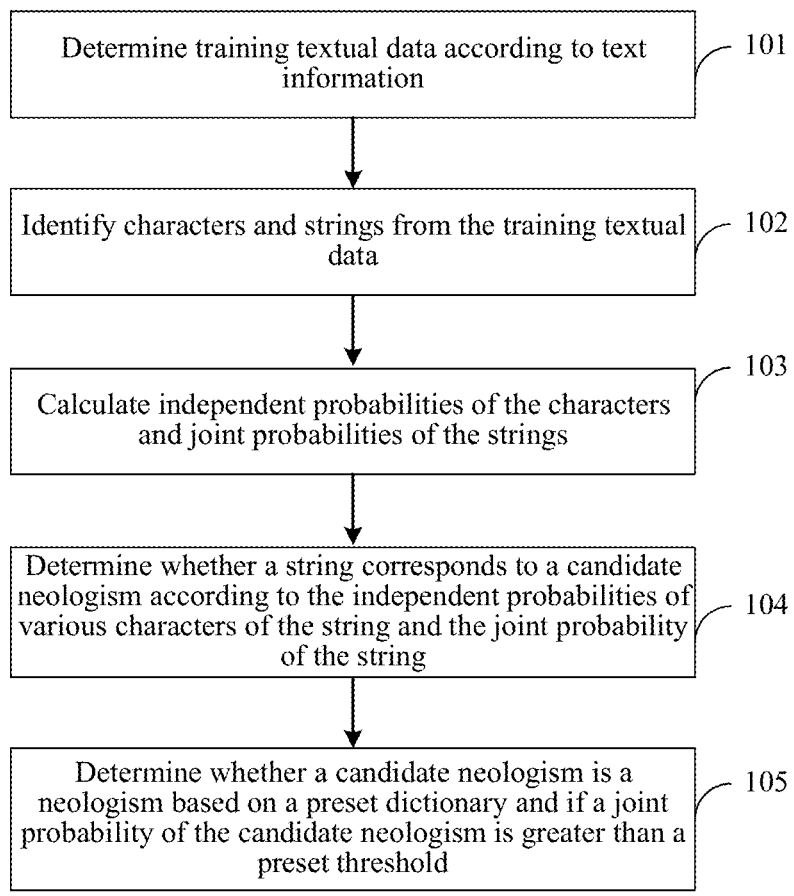
FIG. 1b is a flowchart of a text information processing method according to an embodiment of this application.

As shown in FIG. 1b, a specific procedure of the text information processing method may be as follows:

101: Determine training textual data according to text information.

Before the determining training textual data according to text information, the text information may be first obtained.

The text information may be text information available in a network, such as news or information about movies and television dramas, and/or UGC. The UGC may include text information corresponding to moods, comments, articles, micro blogs and/or blogs published by users.

After the text information is obtained, all of the obtained text information may be used as the training textual data, or a part of the text information may be selected as the training textual data. For example, the text information may be screened according to a preset policy, to remove some useless information, such as emoticons. Afterwards, the screened text information may be used as the training textual data.

102: Identify characters and strings from the training textual data.

The string includes two or more consecutive characters, and may usually include, for example, two, three, or four consecutive characters. The specific number may be set according to an actual application scenario.

It should be noted that the character mentioned in this disclosure may correspond to a Chinese character, Japanese, or the like. For ease of description, various embodiments of this application are described using Chinese characters as an example.

103: Calculate independent probabilities of the characters and joint probabilities of the strings. For example, specific descriptions may be as follows:

(1) Collect respective count numbers of the identified characters in the training textual data, respective count numbers of the identified strings in the training textual data, and a total number of characters in the training textual data.

(2) Calculate for each of the identified characters a respective independent probability of appearance among the training textual data.

For example, the count number of a particular character in the training textual data may be divided by the total number of characters in the training textual data, to obtain the independent probability of the particular character, which is expressed by using a formula as:

$$p(W_k) = \frac{\text{count}(W_k)}{\sum_{i=0}^{N} \text{count}(W_i)}$$

$p(W_k)$ being an independent probability of a character, $\text{count}(W_k)$ being the count number of the character in the training textual data, and $$\sum_{i=0}^{N} \text{count}(W_i)$$

being the total number of words in the training textual data.

(3) Calculate for each of the identified strings a respective joint probability of appearance among the training textual data.

For example, the count number of a particular string in the training textual data may be divided by the total number of characters in the training textual data, to obtain the joint probability of the particular string. This is expressed by using a formula as:

$$p(W_j \ldots W_{j+k}) = \frac{\text{count}(W_j \ldots W_{j+k})}{\sum_{i=0}^{N} \text{count}(W_i)}$$

$p(W_j \ldots W_{j+k})$ being a joint probability of a string, $\text{count}(W_j \ldots W_{j+k})$ being the count number of the string in the training textual data, and $$\sum_{i=0}^{N} \text{count}(W_i)$$

being the total number of characters in the training textual data.

104: Determine whether a string corresponds to a candidate neologism according to independent probabilities of various characters of the string and the joint probability of the string.

In this step, for each string obtained from step 102, it may be determined whether the joint probability of the string is greater than a product of independent probabilities of various characters in the string, and the string is determined as a candidate neologism if the joint probability of the string is greater than the product of the independent probabilities of the various characters in the string. The obtained candidate neologisms may form a candidate neologism set.

For example, a joint probability of a string may be compared with a product of independent probabilities of various characters in the string; and if the joint probability is greater than the product, the string may be determined as a candidate neologism. In a particular example, determining whether a string corresponds to a candidate neologism may include: identifying a current string that needs to be processed; obtaining a joint probability of the current string and independent probabilities of various characters in the current string; and determining the current string as a candidate neologism when the joint probability of the current string is greater than a product of the independent probabilities of the various characters in the current string. This can be expressed by using a formula as:

determining the current string as a candidate neologism when $$p(W_j)p(W_j \ldots W_{j+1}) \ldots p(W_{j+k}) < p(W_j \ldots W_{j+k}).$$

Also, the determined candidate neologism may be added to a candidate neologism set.

Moreover, if a candidate neologism repetitively appears in the training textual data, such candidate neologism is more likely to be an actual neologism. Therefore, in at least one example, the size of the training textual data may be converted into a length of time according to a reading speed of a user. Then, a learning process can be repetitively performed to analyze a pattern of the particular string in the training textual data according to a particular rule (for example, an Ebbinghaus forgetting curve) to determine and update a joint probability of a candidate neologism. That is, after step 104, the text information processing method may further include: determining and updating the joint probability of the candidate neologism according to the joint probability of the particular string and a pattern of the candidate neologism in the training textual data.

For example, the joint probability of the candidate neologism may be updated according to the Ebbinghaus forgetting curve, including the following operations:

(1) Identifying a current candidate neologism that needs to be processed from the candidate neologism set.

(2) Estimating a time required for reading from a training start position in the training textual data to a position of the current candidate neologism, to obtain a forward time.

For example, the training start position in the training textual data and the position (for example, an ordinal position) of the current candidate neologism in the training textual data may be determined; then, a distance between the training start position and the ordinal position is calculated to obtain a first distance; and the first distance is divided by a preset reading speed, to obtain a forward time. This is expressed by using a formula as:

$$T_{pre} = \frac{POS_i}{\delta}$$

$T_{pre}$ indicating a forward time, $POS_i$ indicating a position of the $i^{th}$ candidate neologism in the training textual data, and $\delta$ indicating a reading speed, being a constant, and being set according to an actual application requirement. For example, $\delta$ may be set to 8, that is, 8 words per second.

(3) Estimating a time required for reading from the position of the current candidate neologism to a training end position in the training textual data, to obtain a backward time.

For example, the training end position in the training textual data and the position (for example, a reverse position) of the current candidate neologism in the training textual data may be determined; then, a distance between the reverse position and the training end position is calculated to obtain a second distance; and the second distance is divided by the preset reading speed, to obtain a backward time. This is expressed by using a formula as:

$$T_{bck} = \frac{(Len - POS_i)}{\delta}$$

$T_{bck}$ indicating a backward time, $POS_i$ indicating a position of the $i^{th}$ candidate neologism in the training textual data, Len indicating the total length of the training textual data, and $\delta$ indicating a reading speed, being a constant, and being set according to an actual application requirement. For example, $\delta$ may be set to 8, that is, 8 words per second.

(4) Updating, in real time by using a preset exponential decay function according to the forward time and the backward time, a joint probability of the current candidate neologism, to obtain an updated joint probability.

The exponential decay function may be constructed according to the Ebbinghaus forgetting curve. For example, a formula may be as follows:

$$f(Seq_i) = (1 + f(Seq_i))(e^{-?\pm T_{pre}} + e^{-?\pm T_{bck}})$$

$f(Seq_i)$ representing a joint probability of the candidate neologism that indicates the likelihood of the candidate neologism being an actual neologism, α being an attenuation constant, indicating an attenuation amplitude, and being adjusted according to an actual application requirement, $T_{pre}$ being a forward time, and $T_{bck}$ being a backward time.

It should be noted that, in a particular example, when calculating the joint probability of a candidate neologism, the training start positions for respective iterations may be evenly assigned in the training textual data according to an order of the iterations. As such, each iteration can be performed based on a different start position. Also, the impacts of various start positions to the generation of $T_{pre}$ and $T_{bck}$ can be reduced. In a particular example, before updating the joint probability of the candidate neologism according to the Ebbinghaus forgetting curve, the text information processing method may further include: obtaining a number of required iterations; generating corresponding training start positions evenly assigned in the training textual data according to an order of the iterations, to ensure a different training start position for each iteration; and determining corresponding training end positions according to the training start positions.

In a particular example, determining the training start position in the training textual data may include determining a corresponding training start position according to a current iteration order.

The determining the training end position in the training textual data may include determining a corresponding training end position according to the current iteration order.

The number of required iterations may be set according to an actual application requirement, for example, may be set to 100.

Moreover, it should be further noted that in addition to the Ebbinghaus forgetting curve, the exponential decay function may be further constructed by using another function that can simulate an exponential decay rule, such as Newton's law of cooling.

(5) Identifying another candidate neologism to be processed in the candidate neologism set, that is, return to step (1), until joint probabilities of all candidate neologisms in the candidate neologism set are updated.

105: Determine whether a candidate neologism is a neologism based on a preset dictionary and if a joint probability of the candidate neologism is greater than a preset threshold. For example, determine the candidate neologism as a neologism when the candidate neologism is not in the preset dictionary and a joint probability of the candidate neologism is greater than the preset threshold.

The joint probability of the candidate neologism may correspond to a joint probability of the string calculated in step 104. If the joint probability of the candidate neologism has been updated, the updated joint probability of the candidate neologism is to be used for comparison. In a particular example, step 105 may include determining the candidate neologism as a neologism when the candidate neologism is not in the preset dictionary and an updated joint probability of the candidate neologism is greater than the preset threshold.

The preset threshold and the preset dictionary may be set according to an actual application requirement.

In view of the embodiments described above, the training textual data can be converted into characters and strings; the independent probability of each character and the joint probability of each string are calculated; whether a string is a candidate neologism is determined according to the independent probabilities of the characters of the string and the joint probability of the string; and the candidate neologism is determined as the neologism when the candidate neologism is not in the preset dictionary and a joint probability of the candidate neologism is greater than a preset threshold. In this embodiment, a neologism discovery procedure can be greatly simplified and computational resources can be saved, because there is no need to perform word segmentation or continuously update a word segmentation model. In addition, because there is no need to specify a word segmentation boundary, a case in which a neologism cannot be discovered caused by a blurred neologism boundary can be avoided, thereby greatly improving a successful rate in discovering neologisms with improved efficiency.

Embodiment 2

According to the method described in Embodiment 1, the following further provides detailed descriptions by using an example.

In this embodiment, the descriptions are provided by using Chinese characters as an example, and a text information processing apparatus is integrated into a server.

Figure 2:
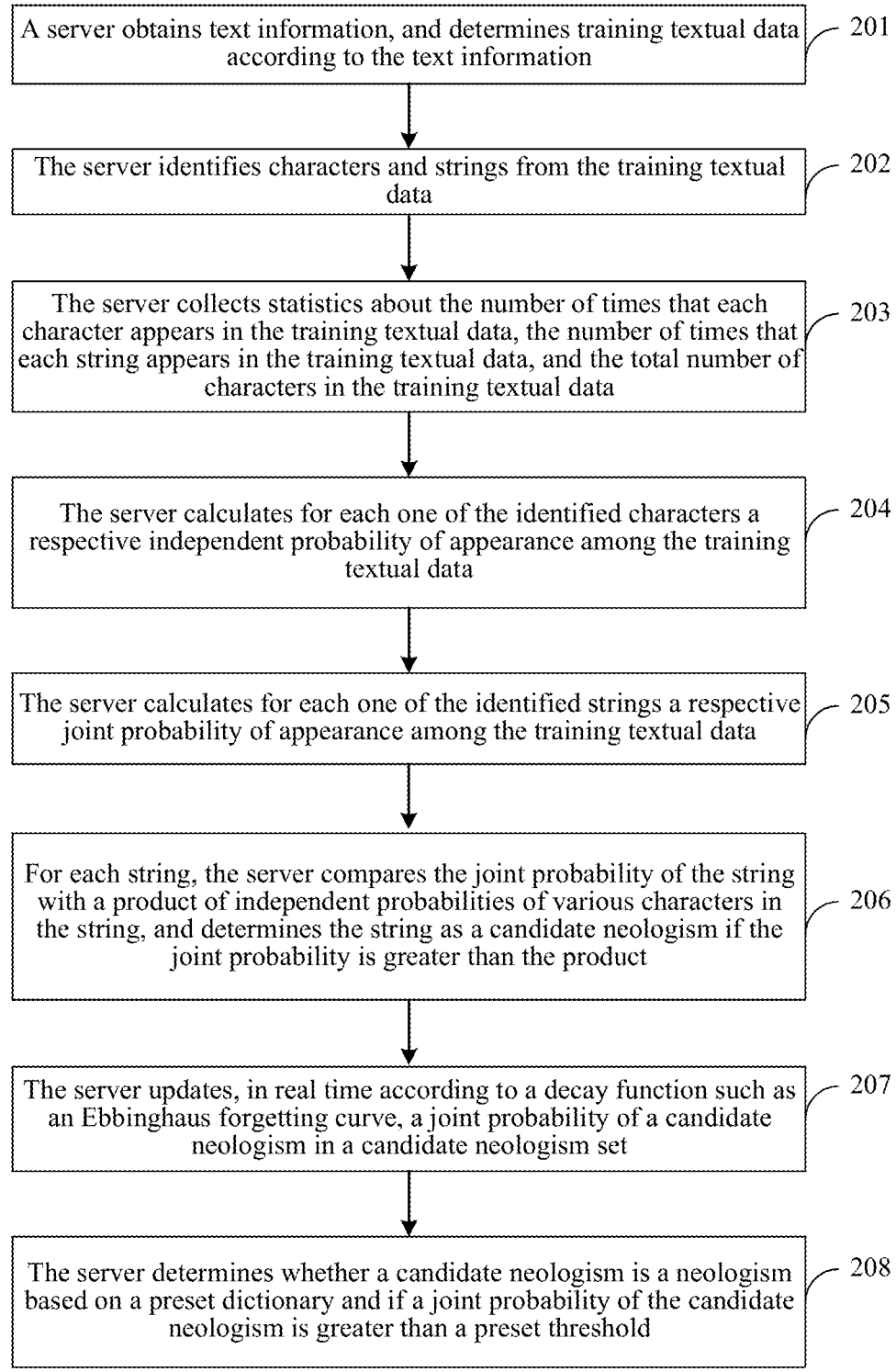
FIG. 2 is a flowchart of another text information processing method according to another embodiment of this application.

As shown in FIG. 2, a specific procedure of a text information processing method may be as follows:

201: The server obtains text information, and determines training textual data according to the text information.

The text information may be text information available in a network, such as news, information about movies and television dramas, and/or UGC. The UGC may include text information corresponding to moods, comments, articles, micro blogs and/or blogs published by users.

After the text information is obtained, all of the obtained text information may be used as the training textual data, or a part of the text information may be selected as the training textual data. For example, the text information may be screened according to a preset policy, to remove some useless information, such as emoticons. Afterwards, the screened text information may be used as the training textual data.

202: The server identifies characters and strings from the training textual data.

The string includes two or more consecutive characters, and may usually include, for example, two, three, or four consecutive characters. The specific number may be set according to an actual application scenario.

203: The server collects statistics about the number of times that each character appears in the training textual data, the number of times that each string appears in the training textual data, and the total number of characters in the training textual data.

204: The server calculates for each of the identified characters a respective independent probability of appearance among the training textual data.

For example, the count number of a particular character in the training textual data may be divided by the total number of characters in the training textual data, to obtain the independent probability of the particular character. This is expressed by using a formula as:

$$p(W_k) = \frac{\text{count}(W_k)}{\sum_{i=0}^{N} \text{count}(W_i)}$$

$p(W_k)$ being an independent probability of a character, count($W_k$) being the character number of the character in the training textual data, and $$\sum_{i=0}^{N} \text{count}(W_i)$$

being the total number of characters in the training textual data.

For example, if the count number of a character "美" in the training textual data is 100, and the total number of characters in the training textual data is 100000, an independent probability of the character "美" is 1/1000; similarly, if the count number of a character "好" in the training textual data is 1000, and the total number of characters in the training textual data is 100000, an independent probability of the character "好" is 1/100. The independent probability of any character in the training textual data may be calculated in a manner similar to that described above.

205: The server calculates for each of the identified strings a respective joint probability of appearance among the training textual data.

For example, the count number of a particular string in the training textual data may be divided by the total number of characters in the training textual data, to obtain the joint probability of the particular string. This is expressed by using a formula as:

$$p(W_j \ldots W_{j+k}) = \frac{\text{count}(W_j \ldots W_{j+k})}{\sum_{i=0}^{N} \text{count}(W_i)}$$

$p(W_j \ldots W_{j+k})$ being a joint probability of a string, $\text{count}(W_j \ldots W_{j+k})$ being the count number of the string in the training textual data, and $$\sum_{i=0}^{N} \text{count}(W_i)$$

being the total number of characters in the training textual data.

For example, if the count number of a string "美好" in the training textual data is 50, and the total number of characters in the training textual data is 100000, a joint probability of the string "美好" is 1/2000; similarly, if the count number of a string "美丽" in the training textual data is 10, and the total number of characters in the training textual data is 100000, a joint probability of the string "美丽" is 1/10000. The joint probability of any string in the training textual data may be calculated in a manner similar to that described above.

It should be noted that step 204 and step 205 may not be implemented in the particular order as illustrated in this disclosure.

206: For each string, the server compares the joint probability of the string with a product of independent probabilities of various characters in the string, and determines the string as a candidate neologism if the joint probability is greater than the product. For example, when $p(W_j)p(W_{j+1}) \ldots p(W_{j+k}) < p(W_j \ldots W_{j+k})$ the corresponding string is determined as a candidate neologism. Then, the candidate neologism may be added to a candidate neologism set. In a particular example, determining whether a string corresponds to a candidate neologism may include: identifying a current string that needs to be processed; obtaining a joint probability of the current string and independent probabilities of various characteristics in the current string; determining the current string as a candidate neologism when the joint probability of the current string is greater than a product of the independent probabilities of the various characteristics in the current string; and adding the candidate neologism to a candidate neologism set.

For example, if a joint probability of a string "美好" is 1/2000, an independent probability of a character "美" is 1/1000, and an independent probability of a character "好" is 1/100, the joint probability of the string "美好" is greater than a product of the independent probabilities of the characters "美" and "好". Therefore, the string "美好" may be determined as a candidate neologism. Other candidate neologisms in the training textual data may be determined in a manner similar to that described above.

207: The server updates, in real time according to a decay function such as an Ebbinghaus forgetting curve, a joint probability of the candidate neologism in the candidate neologism set. For example, updating the joint probability of the candidate neologism may include:

(1) Identifying a current candidate neologism that needs to be processed from the candidate neologism set.

The candidate neologism set may include a plurality of candidate neologisms, and joint probabilities of the candidate neologisms may be updated one by one.

(2) Estimating a time required for reading from a training start position in the training textual data to a position of the current candidate neologism, to obtain a forward time.

For example, the training start position in the training textual data and an ordinal position of the current candidate neologism in the training textual data may be determined; then, a distance between the training start position and the ordinal position is calculated to obtain a first distance; and the first distance is divided by a preset reading speed, to obtain a forward time. This is expressed by using a formula as:

$$T_{pre} = \frac{POS_i}{\delta}$$

$T_{pre}$ indicating a forward time, $POS_i$ indicating a position of the $i^{th}$ candidate neologism in the training textual data, $\delta$ indicating a reading speed, being a constant, and being set according to an actual application requirement. For example, $\delta$ may be set to 8, that is, 8 words per second.

For example, if there are 80000 characters in a distance between an ordinal position of a candidate neologism "美好" in the training textual data and the training start position, and a reading speed $\delta$ 8 words per second, a forward time of the candidate neologism "美好" may be calculated as 80000/8=10000 seconds.

(3) Estimating a time required for reading from the position of the current candidate neologism to a training end position in the training corpus, to obtain a backward time.

For example, the training end position in the training textual data and a reverse position of the current candidate neologism in the training textual data may be determined; then, a distance between the reverse position and the training end position is calculated to obtain a second distance; and the second distance is divided by the preset reading speed, to obtain a backward time. This is expressed by using a formula as:

$$T_{bck} = \frac{(Len - POS_i)}{\delta}$$

$T_{bck}$ indicating a backward time, $POS_i$ indicating a position of the $i^{th}$ candidate neologism in the training textual data, Len indicating the total length of the training textual data, and δ indicating a reading speed, being a constant, and being set according to an actual application requirement. For example, δ may be set to 8, that is, 8 words per second.

For example, if there are 20000 characters in a distance between a reverse position of a candidate neologism "美好" in the training textual data and the training end position (that is, the total length 100000 of the training textual data minus the forward position 80000 of the string "美好"), and a reading speed δ 8 words per second, a backward time of the candidate neologism "美好" may be calculated as 20000/8=2500 seconds.

(4) Updating, in real time by using a preset exponential decay function according to the forward time and the backward time, a joint probability of the current candidate neologism, to obtain an updated joint probability.

The exponential decay function may be constructed according to the Ebbinghaus forgetting curve. For example, a formula may be as follows:

$$f(Seq_i) = (1 + f(Seq_i))(e^{-?\pm T_{pre}} + e^{-?\pm T_{bck}})$$

$f(Seq_i)$ representing a joint probability of the candidate neologism that indicates the likelihood of the candidate neologism being an actual neologism, α being an attenuation constant, indicating an attenuation amplitude, and being adjusted according to an actual application requirement, $T_{pre}$ being a forward time, and $T_{bck}$ being a backward time.

It should be noted that, in a particular example, when calculating the joint probability of a candidate neologism, the training start positions for respective iterations may be evenly assigned in the training textual data according to an order of the iterations. As such, each iteration can be performed based on a different start position. Also, the impacts of various start positions to the generation of $T_{pre}$ and $T_{bck}$ can be reduced. In a particular example, before updating the joint probability of the candidate neologism according to the Ebbinghaus forgetting curve, the text information processing method may further include: obtaining a number of required iterations; generating corresponding training start positions evenly assigned in the training textual data according to an order of the iterations, to ensure a different training start position for each iteration; and determining corresponding training end positions according to the training start positions.

In a particular example, determining the training start position in the training textual data may include determining a corresponding training start position according to a current iteration order.

The determining the training end position in the training textual data may include determining a corresponding training end position according to the current iteration order.

The number of required iterations may be set according to an actual application requirement, for example, may be set to 100.

For example, it is assumed that the selected training textual data include 100000 pieces of text, and the number of iterations is set to 100. In this case, a start position for the first round of iteration is the $1^{st}$ piece of text and an end position is the 100000th piece of text, a start position for the second round of iteration is the $1001^{st}$ piece of text and a corresponding end position is the 999th piece of text. In a particular example, a generalized expression for a start position for the $k^{th}$ (k<100) round of iteration is the $(1000*(k-1)+1)^{th}$ pieces of text and a generalized expression for an end position is the $(1000*(k-1)-1)^{th}$ pieces of text.

(5) Identifying another candidate neologism to be processed in the candidate neologism set, that is, return to step (1), until joint probabilities of all candidate neologisms in the candidate neologism set are updated.

208: The server determines whether a candidate neologism is a neologism based on a preset dictionary and if a joint probability of the candidate neologism is greater than a preset threshold. For example, the server can determine the candidate neologism in the candidate neologism set as a neologism when the candidate neologism is not in the preset dictionary and the updated joint probability is greater than the preset threshold.

For example, the candidate neologism in the candidate neologism set may be matched with words in the preset dictionary. If the candidate neologism is not in the dictionary, and a current joint probability (that is, the updated joint probability) of the candidate neologism is greater than the preset threshold, it is determined that the candidate neologism is a neologism. If the candidate neologism is in the dictionary, the candidate neologism is by definition not a neologism. Moreover, if a current joint probability (that is, the updated joint probability) of the candidate neologism is less than or equal to the preset threshold, although the candidate neologism is not in the dictionary, it is determined that the candidate neologism is not a neologism.

The preset threshold and the preset dictionary may be set according to an actual application requirement.

For example, if a candidate neologism "美好" has been in the dictionary, the candidate neologism "美好" will not be determined as a neologism. In another example, if a candidate neologism "猴赛雷" is not in the dictionary, and a joint probability of "猴赛雷" is greater than the preset threshold, it may be determined that "猴赛雷" is a neologism.

In view of the embodiments described above, the training textual data can be converted into characters and strings; the independent probability of each character and the joint probability of each string are calculated; whether a string is a candidate neologism is determined according to the independent probabilities of the characters of the string and the joint probability of the string; and the candidate neologism is determined as the neologism when the candidate neologism is not in the preset dictionary and a joint probability of the candidate neologism is greater than a preset threshold. In this embodiment, a neologism discovery procedure can be greatly simplified and computational resources can be saved, because there is no need to perform word segmentation or continuously update a word segmentation model. In addition, because there is no need to specify a word segmentation boundary, a case in which a neologism cannot be discovered caused by a blurred neologism boundary can be avoided, thereby greatly improving a successful rate and efficiency in discovering neologisms.

The method as described herein may be used for generation of a large-scale thesaurus, word weight value calculation (key word or topic word extraction), and generation of an extended dictionary, and may be further used for word detection such as detecting a malicious comment, and the like.

Embodiment 3

Figure 3A:
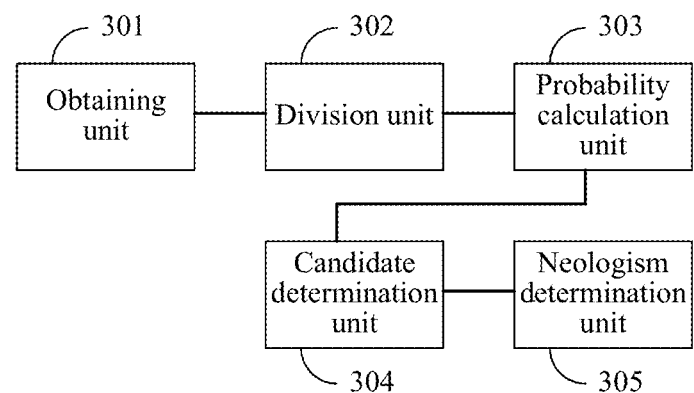
FIG. 3a is a structural block diagram of a text information processing apparatus according to an embodiment of this application.

To implement the foregoing method, this embodiment of this application further provides a text information processing apparatus. As shown in FIG. 3a, the text information processing apparatus may include an obtaining unit 301, a division unit 302, a probability calculation unit 303, a candidate determination unit 304, and a neologism determination unit 305. Descriptions are as follows:

(1) Obtaining Unit 301

The obtaining unit 301 is configured to determine training textual data according to text information.

The text information may include various text information available in a network, for example, news, information about movies and television dramas, and UGC. The UGC may include text information corresponding to moods, comments, articles, micro blogs and/or blogs published by users. After the text information is obtained, all of the obtained text information may be used as the training textual data, or a part of the text information may be selected as the training textual data. For example, the text information may be screened according to a preset policy, to remove some useless information, such as emoticons. Afterwards, the screened text information may be used as the training textual data.

(2) Division Unit 302

The division unit 302 is configured to identify characters and strings from the training textual data, thus dividing the training textual data into characters and strings.

The string includes two or more consecutive characters, and may usually include, for example, two, three, or four consecutive characters. The specific number may be set according to an actual application scenario.

(3) Probability Calculation Unit 303

The probability calculation unit 303 is configured to collect statistics about the characters and strings and calculate independent probabilities of the characters and joint probabilities of the strings. For example, the probability calculation unit 303 may be specifically configured to: collect respective count numbers of the identified characters in the training textual data, respective count numbers of the identified strings in the training textual data, and a total number of characters in the training textual data; calculate for each of the identified characters a respective independent probability of appearance among the training textual data; and for each of the identified strings a respective joint probability of appearance among the training textual data.

For details, refer to the foregoing method embodiments. Details are not described herein again.

(4) Candidate Determination Unit 304

The candidate determination unit 304 is configured to determine whether a string corresponds to a candidate neologism according to independent probabilities of various characters of the string and the joint probability of the string.

For example, a joint probability of a string may be compared with a product of independent probabilities of various characters in the string; and if the joint probability is greater than the product, the string may be determined as a candidate neologism. In a particular example, the candidate determination unit 304 may be configured to: determine, for each string identified by the division unit 302, whether a joint probability of the string is greater than a product of independent probabilities of various characteristics in the string; and determine the string as a candidate neologism if the joint probability of the string is greater than the product of the independent probabilities of the various characteristics in the string.

(5) Neologism Determination Unit 305

The neologism determination unit 305 is configured to determine whether a candidate neologism is a neologism based on a preset dictionary and if a joint probability of the candidate neologism is greater than a preset threshold. For example, determine the candidate neologism as a neologism when the candidate neologism is not in the preset dictionary and a joint probability corresponding to the candidate neologism is greater than the preset threshold.

The preset threshold and the dictionary may be set according to an actual application requirement.

Figure 3B:
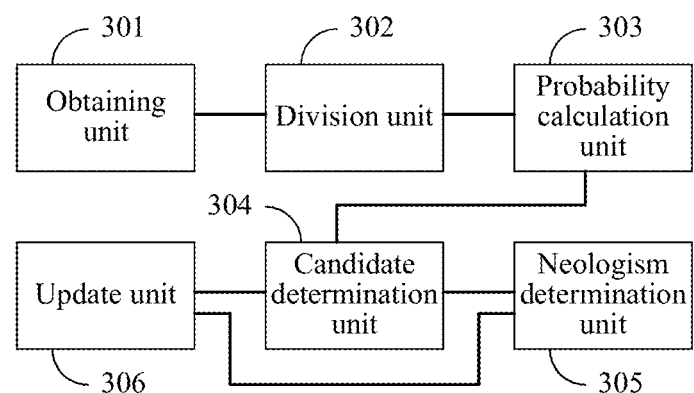
FIG. 3b is a structural block diagram of a text information processing apparatus according to another embodiment of this application.

Moreover, if a candidate neologism repetitively appears in the training textual data, such candidate neologism is more likely to be an actual neologism. Therefore, in at least one example, the size of the training textual data may be converted into a length of time according to a reading speed of a user. Then, a learning process can be repetitively performed to analyze a pattern of the particular string in the training textual data according to a particular rule (for example, an Ebbinghaus forgetting curve) to determine and update a joint probability of a candidate neologism. That is, in a particular example, as shown in FIG. 3*b*, the text information processing apparatus may further include an update unit 306. Descriptions are as follows:

The update unit 306 may be configured to update the joint probability of the candidate neologism according to a particular rule.

In this example, the determining unit 305 may be configured to determine the candidate neologism as a neologism when the candidate neologism is not in the preset dictionary and an updated joint probability is greater than the preset threshold.

For example, the update unit 306 may be configured to: estimate a time required for reading from a training start position in the training textual data to a position of the candidate neologism, to obtain a forward time; estimate a time required for reading from the position of the candidate neologism to a training end position in the training textual data, to obtain a backward time; and update the joint probability of the candidate neologism by using a preset exponential decay function according to the forward time and the backward time, to obtain an updated joint probability of the candidate neologism. The particular rule may correspond to an Ebbinghaus forgetting curve, and the exponential decay function may be constructed according to the Ebbinghaus forgetting curve.

In addition, the update unit 306 may be configured to determine the training start position in the training textual data and a position (for example, an ordinal position) of a current candidate neologism in the training textual data. The update unit 306 may be further specifically configured to: calculate a distance between the training start position and the position of the current candidate neologism, to obtain a first distance; and divide the first distance by a preset reading speed, to obtain the forward time.

The update unit 306 may be specifically configured to determine the training end position in the training textual data and a position (for example, a reverse position) of a current candidate neologism in the training textual data. The update unit 306 may be further specifically configured to: calculate a distance between the position of the current candidate neologism and the training end position, to obtain a second distance; and divide the second distance by the preset reading speed, to obtain the backward time.

In some implementations, the foregoing units may be implemented as independent hardware components, or may be combined arbitrarily, or may be implemented as a same hardware component or several hardware components. For specific implementation of the foregoing units, refer to the foregoing method embodiments. Details are not described herein again.

The text information processing apparatus may be specifically integrated into a network device such as a server.

In view of the embodiments described above, the division unit 302 of the text information processing apparatus may convert the training textual data into characters and strings; the probability calculation unit 303 may collect statistics and calculate independent probabilities of the characters and the joint probabilities of the strings in the training textual data; the candidate determination unit 304 determines whether a string corresponds to a candidate neologism according to independent probabilities of various characters of the string and the joint probability of the string; and the neologism determination unit 305 determines whether a candidate neologism is a neologism based on a preset dictionary and if a joint probability of the candidate neologism is greater than a preset threshold. For example, the neologism determination unit 305 may determine the candidate neologism as the neologism when the candidate neologism is not in the preset dictionary and a joint probability corresponding to the candidate neologism is greater than the preset threshold. In this embodiment, a neologism discovery procedure can be greatly simplified and computational resources can be saved because there is no need to perform word segmentation or continuously update a word segmentation model. In addition, because there is no need to specify a word segmentation boundary, a case in which a neologism cannot be discovered caused by a blurred neologism boundary can be avoided, thereby greatly improving a successful rate and efficiency in discovering neologisms.

Embodiment 4

Correspondingly, this embodiment of this application further provides a text information processing system, including any text information processing apparatus according to the embodiments of this application. For details, refer to Embodiment 3. For example, descriptions may be as follows:

The text information processing apparatus is configured to: identify characters and strings from the training textual data; calculate for each of the identified characters a respective independent probability of appearance among the training textual data; calculate for each of the identified strings a respective joint probability of appearance among the training textual data; determine whether a particular string of the identified strings corresponds to a candidate neologism according to the independent probabilities of various characters of the particular string and the joint probability of the particular string; and, after the particular string is determined to correspond to the candidate neologism, determine the candidate neologism as a neologism when the candidate neologism is not in a preset dictionary and a joint probability of the candidate neologism is greater than a preset threshold The text information may include various text information available in a network, for example, news, information about movies and television dramas, and UGC. The UGC may include text information corresponding to moods, comments, articles, micro blogs and/or blogs published by users.

The text information processing system may further include other devices such as a storage server configured to store data and a terminal device configured to publish text information. Details are not described herein again.

For specific implementation of the foregoing devices, refer to the foregoing method embodiments. Details are not described herein again.

The text information processing system may include any text information processing apparatus provided in the embodiments of the present disclosure, and therefore, can achieve the beneficial effects that can be achieved by any text information processing apparatus provided in the embodiments of the present disclosure. For details, refer to the foregoing embodiments. Details are not described herein again.

Embodiment 5

Figure 4:
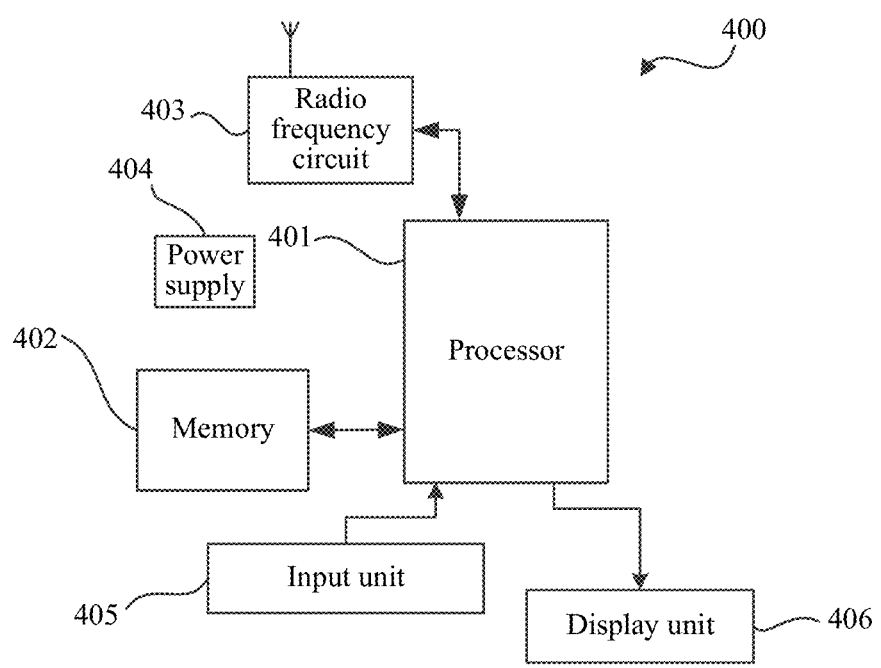
FIG. 4 is a structural block diagram of a server according to an embodiment of the present disclosure.

This embodiment of this application further provides a computing apparatus. As shown in FIG. 4, the computing apparatus in this embodiment of this application is shown by using a server 400 as an example. Specifically:

The server 400 may include components such as a processor 401 including one or more processing cores, a memory 402 including one or more non-transitory and/or transitory computer readable storage media, a radio frequency (RF) circuit 403, a power supply 404, an input unit 405, and a display unit 406. A person skilled in the art may understand that the server structure shown in FIG. 4 is a non-limiting example. A server may include more or fewer parts than those shown in FIG. 4, may combine some parts, or may have different part arrangements.

The processor 401 is a control center of the server 400, and is connected to various parts of the entire server 400 by using various interfaces and lines. By running or executing a software program and/or module stored in the memory 402, and accessing data stored in the memory 402, the processor 401 executes various functions of the server 400 and performs data processing, thereby monitoring the operation of the entire server 400. Optionally, the processor 401 may include one or more processor cores. Preferably, the processor 401 may integrate an application processor and a modulation/demodulation processor. The application processor mainly handles an operating system, a user interface, an application program, and the like. The modulation/demodulation processor mainly handles wireless communication. It may be understood that the foregoing modulation/demodulation processor may also not be integrated into the processor 401.

The memory 402 may be configured to store software programs and modules. The processor 401 can execute one or more of the software programs and modules stored in the memory 402, to implement various applications and data processing. The memory 402 may mainly include a program storage area and a data storage area. The program storage area may store an operating system, an application program required by at least one function (such as a sound playing function and an image display function), and the like. The data storage area may store data created according to use of the server, and the like. In addition, the memory 402 may include a high-speed random access memory, and may also include a non-volatile memory, such as at least one magnetic disk storage device, a flash memory, or another volatile solid-state storage device. Moreover, the memory 402 may further include a memory controller to facilitate the access to the memory 402 by the processor 401.

The RF circuit 403 may be configured to receive and send a signal during information transmission and receiving. Especially, the RF circuit 403 sends, after receiving downlink information from a base station, the information to one or more processors 401 for processing, and sends uplink data to the base station. Generally, the RF circuit 403 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 403 may also communicate with a network and another device by wireless communication. The wireless communication may use any communications standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The server 400 further includes the power supply 404 (for example, a battery) that supplies power to each component of the server 400. Preferably, the power supply 404 may be logically connected to the processor 401 by using a power supply management system, so that functions such as management of charging, discharging, and power consumption are implemented by using the power supply management system. The power supply 404 may further include one or more of a direct current or alternating current power supply, a re-charging system, a power failure detection circuit, a power supply converter or inverter, a power supply state indicator, and any other components.

The server 400 may further include the input unit 405. The input unit 405 may be configured to receive entered numeric or character information and generate keyboard, mouse, joystick, optical, or trackball signal input in response to user operations or controls. In a particular embodiment, the input unit 405 may include a touch-sensing device and/or another input device. The touch-sensing device, which may also be referred to as a touch screen or a touch panel, may collect a touch operation of a user on or near the touch-sensing device (such as an operation of a user on or near the touch-sensing device by using any suitable object or accessory such as a finger or a stylus), and drive a corresponding connection apparatus according to a preset program. Optionally, the touch-sensing device may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 401. Moreover, the touch controller can receive and execute a command sent from the processor 401. In addition, the touch-sensing device may be implemented in multiple types, such as a resistive type, a capacitive type, an infrared type, and a surface acoustic wave type. In addition to the touch-sensing device, the input unit 405 may further include another input device. Specifically, the another input device may include but is not limited to one or more of a physical keyboard, a function key (for example, a volume control key or a power on/off key), a trackball, a mouse, or a joystick.

The server 400 may further include the display unit 406. The display unit 406 may be configured to display information entered by the user or information that is provided to the user, and graphical user interfaces of the server 400. The graphical user interfaces each may include an image, text, an icon, a video, or any combination thereof. The display unit 406 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensing device, the touch-sensing device transfer the touch operation to the processor 401 to determine a type of a touch event, and then the processor 401 provides corresponding visual output on the display panel according to the type of the touch event. Although in FIG. 4, the touch-sensing device and the display panel are used as two separate parts to implement input and output functions, in some embodiments, the touch-sensing device and the display panel may be integrated to implement the input and output functions.

Although not shown, the server 400 may further include a camera, a Bluetooth module, and the like. Details are not further provided herein. Specifically, in this embodiment, the processor 401 of the server 400 may load, according to the following instructions, executable files corresponding to processes of one or more application programs into the memory 402. The processor 401 runs the application programs stored in the memory 402, to implement any of the various functions, as described above. For example, the functions including: identifying characters and strings from the training textual data; calculating for each of the identified characters a respective independent probability of appearance among the training textual data; calculating for each of the identified strings a respective joint probability of appearance among the training textual data; determining whether a particular string of the identified strings corresponds to a candidate neologism according to independent probabilities of various characters of the particular string and the joint probability of the particular string; and, after the particular string is determined to correspond to the candidate neologism, determining the candidate neologism as a neologism when the candidate neologism is not in a preset dictionary and a joint probability of the candidate neologism is greater than a preset threshold For specific implementation of the above operations and corresponding beneficial effects, refer to the foregoing embodiments. Details are not described herein again.

A person of ordinary skill in the art may understand that all or some of the steps of the methods in the foregoing embodiments may be implemented by a program instructing relevant hardware. The program may be stored in a non-transitory computer readable storage medium. The storage medium may include a read-only memory (ROM), a random access memory (RAM), a magnetic disk, an optical disc, or the like.

The text information processing method, apparatus, non-transitory computer-readable storage medium, and system provided in the embodiments of this application are described above in detail. This specification explains the principles and implementations of this application by using specific examples. The descriptions of the foregoing embodiments are merely intended to help understand the method of this application and the core idea of this application. In addition, a person skilled in the art may make some variations in specific implementations and application scopes according to the idea of this application. Therefore, this specification shall not be construed as a limitation to this application.

What is claimed is:

1. A text information processing method, comprising:
   determining training textual data according to text information;
   identifying, by processing circuitry of a text information processing apparatus, characters and strings from the training textual data;
   calculating for each of the identified characters a respective independent probability of appearance among the training textual data;
   calculating for each of the identified strings a respective joint probability of appearance among the training textual data;
   determining, by the processing circuitry of the text information processing apparatus, whether a particular string of the identified strings corresponds to a candidate neologism according to independent probabilities of various characters of the particular string and the joint probability of the particular string; and after the particular string is determined to correspond to the candidate neologism, determining, by the processing circuitry of the text information processing apparatus, the candidate neologism as a neologism when the candidate neologism is not in a preset dictionary and a joint probability of the candidate neologism is greater than a preset threshold.

2. The method according to claim 1, further comprising:

collecting respective count numbers of the identified characters in the training textual data, respective count numbers of the identified strings in the training textual data, and a total number of characters in the training textual data, wherein the calculating for each of the identified characters the respective independent probability of appearance among the training textual data includes calculating the independent probability of a particular character according to the count number of the particular character in the training textual data and the total number of characters in the training textual data, and the calculating for each of the identified strings the respective joint probability of appearance among the training textual data includes calculating the joint probability of a particular string according to the count number of the particular string in the training textual data and the total number of characters in the training textual data.

3. The method according to claim 1, wherein the determining whether the particular string of the identified strings corresponds to the candidate neologism comprises:

determining that the particular string corresponds to the candidate neologism when the joint probability of the particular string is greater than a product of the independent probabilities of various characters of the particular string.

4. The method according to claim 1, wherein each string comprises at least two consecutive characters.

5. The method according to claim 1, further comprising:

after the particular string is determined to correspond to the candidate neologism, determining the joint probability of the candidate neologism according to the joint probability of the particular string and a pattern of the candidate neologism in the training textual data.

6. The method according to claim 5, wherein the determining the joint probability of the candidate neologism comprises:

estimating a time required for reading from a training start position in the training textual data to a position of the candidate neologism, to obtain a forward time;

estimating a time required for reading from the position of the candidate neologism to a training end position in the training textual data, to obtain a backward time; and updating the joint probability of the candidate neologism by using a preset exponential decay function according to the forward time and the backward time.

7. The method according to claim 6, wherein the exponential decay function is constructed according to an Ebbinghaus forgetting curve.

8. The method according to claim 6, wherein the estimating the time required for reading from the training start position in the training textual data to the position of the candidate neologism comprises:

calculating a distance between the training start position in the training textual data to the position of the candidate neologism, to obtain a first distance; and dividing the first distance by a preset reading speed, to obtain the forward time.

9. The method according to claim 6, wherein the estimating the time required for reading from the position of the candidate neologism to the training end position in the training textual data comprises:

calculating a distance between the position of the candidate neologism to the training end position in the training textual data, to obtain a second distance; and dividing the second distance by a preset reading speed, to obtain the backward time.

10. A text information processing apparatus, comprising:

processing circuitry configured to:

determine training textual data according to text information;

identify characters and strings from the training textual data;

calculate for each of the identified characters a respective independent probability of appearance among the training textual data;

calculate for each of the identified strings a respective joint probability of appearance among the training textual data;

determine whether a particular string of the identified strings corresponds to a candidate neologism according to independent probabilities of various characters of the particular string and the joint probability of the particular string; and after the particular string is determined to correspond to the candidate neologism, determine the candidate neologism as a neologism when the candidate neologism is not in a preset dictionary and a joint probability of the candidate neologism is greater than a preset threshold.

11. The apparatus according to claim 10, wherein the processing circuitry is further configured to:

collect respective count numbers of the identified characters in the training textual data, respective count numbers of the identified strings in the training textual data, and a total number of characters in the training textual data;

calculate the independent probability of a particular character according to the count number of the particular character in the training textual data and the total number of characters in the training textual data; and calculate the joint probability of a particular string according to the count number of the particular string in the training textual data and the total number of characters in the training textual data.

12. The apparatus according to claim 10, wherein the processing circuitry is further configured to:

determine that the particular string correspond to the candidate neologism when the joint probability of the particular string is greater than a product of the independent probabilities of various characters of the particular string.

13. The apparatus according to claim 10, wherein each string comprises at least two consecutive characters.

14. The apparatus according to claim 10, wherein the processing circuitry is further configured to:

after the particular string is determined to correspond to the candidate neologism, determine the joint probability of the candidate neologism according to the joint probability of the particular string and a pattern of the candidate neologism in the training textual data.

15. The apparatus according to claim 14, wherein the processing circuitry is further configured to:
   estimate a time required for reading from a training start position in the training textual data to a position of the candidate neologism, to obtain a forward time;
   estimate a time required for reading from the position of the candidate neologism to a training end position in the training textual data, to obtain a backward time; and
   update the joint probability of the candidate neologism by using a preset exponential decay function according to the forward time and the backward time.

16. The apparatus according to claim 15, wherein the exponential decay function is constructed according to an Ebbinghaus forgetting curve.

17. The apparatus according to claim 15, wherein the processing circuitry is further configured to:
   calculate a distance between the training start position in the training textual data to the position of the candidate neologism, to obtain a first distance; and
   divide the first distance by a preset reading speed, to obtain the forward time.

18. The apparatus according to claim 15, wherein the processing circuitry is further configured to:
   calculate a distance between the position of the candidate neologism to the training end position in the training textual data, to obtain a second distance; and
   divide the second distance by a preset reading speed, to obtain the backward time.

19. A non-transitory computer readable storage medium storing program instructions, which, when being executed by a processor of a computer, cause the computer to perform:
   determining training textual data according to text information;
   identifying characters and strings from the training textual data;
   calculating for each of the identified characters a respective independent probability of appearance among the training textual data;
   calculating for each of the identified strings a respective joint probability of appearance among the training textual data;
   determining whether a particular string of the identified strings corresponds to a candidate neologism according to independent probabilities of various characters of the particular string and the joint probability of the particular string; and
   after the particular string is determined to correspond to the candidate neologism, determining the candidate neologism as a neologism when the candidate neologism is not in a preset dictionary and a joint probability of the candidate neologism is greater than a preset threshold.

20. The non-transitory computer readable storage medium according to claim 19, wherein the stored program instructions, when being executed by the processor of the computer, further causes the computer to perform:
   after the particular string is determined to correspond to the candidate neologism, determining the joint probability of the candidate neologism according to the joint probability of the particular string and a pattern of the candidate neologism in the training textual data.

* * * * *